United States Patent [19]

Nakane

[11] 4,274,524
[45] Jun. 23, 1981

[54] ROTATIONAL TORQUE TRANSMISSION MECHANISM

[75] Inventor: Mototaka Nakane, Toyota, Japan

[73] Assignees: Aisin Seiki Kabushiki Kaisha, Kariya; Toyota Jidosha Kogyo Kabushiki Kaisha, Toyota, both of Japan

[21] Appl. No.: 63,524

[22] Filed: Aug. 3, 1979
(Under 37 CFR 1.47)

[30] Foreign Application Priority Data

Aug. 3, 1978 [JP] Japan ............................ 53-94794

[51] Int. Cl.³ .................... F16D 7/02; F16F 15/12
[52] U.S. Cl. .............................. 192/48.3; 64/27 C; 74/574; 192/56 R; 192/70.17
[58] Field of Search ............... 192/48.3, 48.1, 106.1, 192/106.2, 56 R, 55, 70.17, 30 V; 74/574; 64/27 F, 30 R, 27 C

[56] References Cited

U.S. PATENT DOCUMENTS

| 1,325,057 | 12/1919 | Tibbetts | 74/574 |
| 1,635,855 | 7/1927 | Moorhouse | 74/574 |
| 2,364,988 | 12/1944 | McFarland | 64/30 R X |
| 2,859,637 | 11/1958 | Hagenlocher | 74/574 |
| 4,002,043 | 1/1977 | Yoshida | 64/27 C |
| 4,171,147 | 10/1979 | Swisher et al. | 64/27 F X |
| 4,220,233 | 9/1980 | Ban et al. | 192/106.2 |
| 4,222,476 | 9/1980 | LeBrise | 192/106.2 |

FOREIGN PATENT DOCUMENTS

| 675483 | 12/1963 | Canada | 74/574 |
| 423948 | 2/1935 | United Kingdom | 74/574 |
| 2000257 | 1/1979 | United Kingdom | 74/574 |

Primary Examiner—Rodney H. Bonck
Attorney, Agent, or Firm—Finnegan, Henderson, Farabow, Garrett & Dunner

[57] ABSTRACT

A clutch assembly for automotive vehicles as one application of the rotational torque transmission mechanism comprises an inertia member divided to a driving plate connected to an engine crank shaft and a flywheel connected to a clutch cover. Between the driving plate and the flywheel is provided dampers and a torque limiting clutch which will permit the slidable rotation of the driving plate relative to the flywheel. Thus, any vigorous torque variation on the crank shaft particularly at the low speed of the engine may be absorbed or diminished to thereby avoid the objectionable torque transmission to a clutch output member.

5 Claims, 3 Drawing Figures

ROTATIONAL TORQUE TRANSMISSION MECHANISM

BACKGROUND OF THE INVENTION

This invention generally relates to a rotational torque transmission mechanism and more particularly to improvements in a rotational torque transmission mechanism provided with two divided inertia members so as to absorb the torque variation.

One of the typical applications of such mechanism is a clutch assembly for automotive vehicles in which a rotational torque on an engine crank shaft should be transmitted to a clutch output shaft through a flywheel fixed to the crank shaft and a clutch disc assembly. In the event that any torsional vibration or vigorous torque variation should be caused on the input member such as crank shaft, the output member such as clutch output shaft would be damaged due to the vibration or torque variation without any damping members. Therefore, it is a conventional practice to provide the damping members on the clutch disc or the flywheel in order to dampen the torsional vibration or diminish the vigorous torque more than a predetermined value.

Although these conventional damping members are effective in the high speed range of the engine, the vigorous torque variation in the low speed range of the engine will not be effectively absorbed by these damping members. The torque variation is most often and vigorously experienced at the low speed of the engine such as below the engine idling, so that the conventional damping members are insufficient to realize the smooth torque transmission.

SUMMARY OF THE INVENTION

It is therefore one of the objects of the invention to provide a rotational torque transmission mechanism which may obviate the conventional drawbacks as mentioned above.

It is another object of the invention to provide a rotational torque transmission mechanism which will absorb the objectionable torque variation in the low speed range of the engine as well as in the high speed range.

It is a further object of the invention to provide a rotational torque transmission mechanism which is simple in construction and reliable in operation.

According to the invention, briefly summarized the rotational torque transmission mechanism includes two divided inertia members, i.e., a driving plate and a flywheel between which are interposed limiting means for torque transmission and damping means.

Other objects and features of the invention will be apparent from the following description in conjunction with the accompanying drawings.

DETAILED DESCRIPTION OF THE PREFERRED EMBODIMENT

Figure 1:
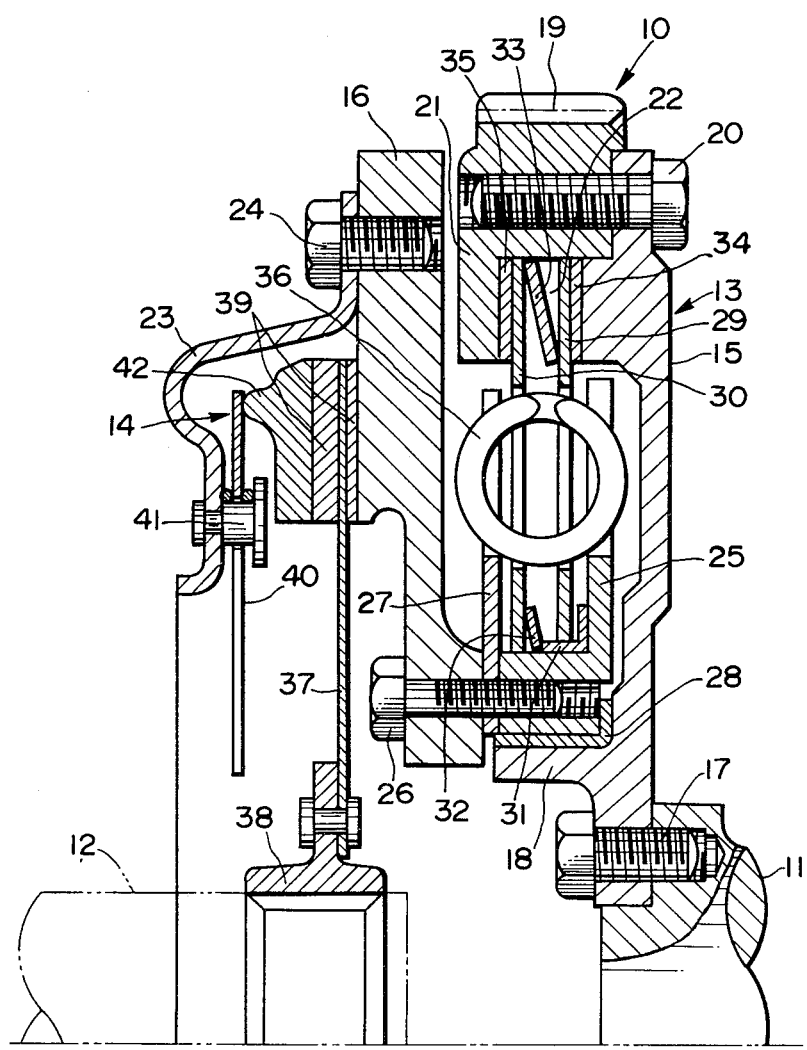
FIG. 1 is a sectional view of a clutch assembly illustrative of one embodiment in accordance with the invention, only upper half of the clutch assembly being shown.

Referring now to the drawings, especially FIG. 1 thereof, there is shown one embodiment of the invention adapted in a clutch assembly of automotive vehicles generally indicated by the reference numeral 10. The clutch assembly 10 is connected to an engine crank shaft 11 forming an input or driving member so as to drive an output shaft 12 forming an output or driven member. The clutch assembly 10 includes an inertia member 13 and a clutch disc assembly 14 thereby enabling the optimum transmission of the rotational torque of the crank shaft 11 to the output shaft 12.

The inertia member 13 is divided into an annular driving plate 15 and a flywheel 16. The driving plate 15 is fixed at the inner periphery thereof to the crank shaft 11 by means of bolts 17 and provided with an annular projection 18. A ring gear 19 is fixed to the outer periphery of the driving plate 15 by means of bolts 20 and provided with a radially downward shoulder 21 thereby constituting an annular space 22 between the shoulder 21 and the outer periphery of the driving plate 15.

The flywheel 16 is secured to the clutch cover 23 by bolts 24 and rotatable with respect to the driving plate 15. At the inner peripheral portion of the flywheel 16 is fixed a first driven plate 25 of L-shaped section by means of bolts 26.

Between the flywheel 16 and the first driven plate 25 is fixedly mounted a second driven plate 27 so that the flywheel 16 as well as the first and the second driven plates 25, 27 may be rotated in a limited range with respect to the driving plate 15 through a bushing 28.

Between the first and the second driven plates 25, 27 are interposed a first driving disc 29 and a second driving disc 30 in a free condition relative thereto. A thrust plate 31 of L-shape section is slidably carried on the first driven plate 25 but is prevented from rotation. A thrust cone spring 32 is in abutment on the thrust plate 31 and on the second driving disc 30.

Within the annular space 22 are disposed the outer peripheral portions of the first and the second driving discs 29, 30 between which is mounted a diaphragm spring 33 so as to press a first frictional plate 34 on the driving plate 15 and a second frictional plate 35 on the shoulder 21 of the ring gear 19. Compressing springs 36 are disposed on the first and the second driven plates 25, 27 and the first and the second driving plates 29, 30 thereby transmitting the rotational torque to the former plates from the latter plates.

The clutch disc assembly 14 is substantially of a conventional structure and schematically illustrated. The clutch disc assembly 14 generally includes a disc plate 37 carried on an axially slidable hub 38 and provided with frictional facings 39, a diaphragm spring 40 mounted on the clutch cover 23 through rivets 41, and a pressure plate 42 which will bring the frictional facings 39 to the clutch engagement condition due to action of the diaphragm spring 40.

In operation, the rotational torque of the crank shaft 11 is directly transmitted to the driving plate 15 and the ring gear 19 and then to the first and the second driving discs 29, 30 through the first and the second frictional plates 34, 35 which are brought in frictional abutment on the driving plate 15 and the ring gear 19 due to action of the diaphragm spring 33. The rotational torque is then transmitted to the first and the second driven plates 25, 27 and to the flywheel 16 fixed thereto thereby rotating the output shaft 12 in a manner as well-known.

Figure 2:
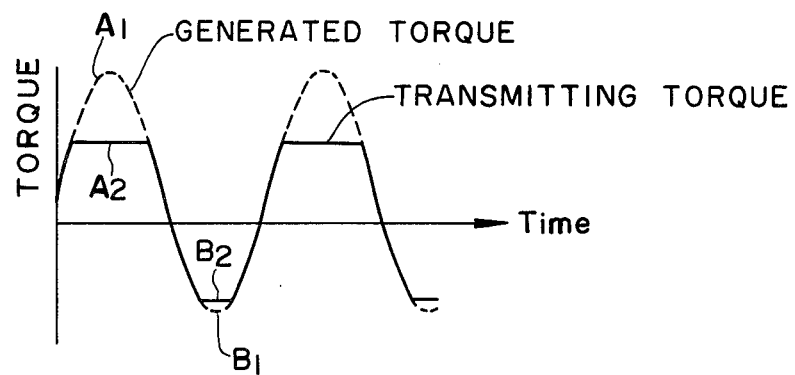
FIG. 2 is a schematic representation for explanation of the torque transmission by the clutch assembly of FIG. 1.

The torsional vibration will be absorbed by the compression springs 36 during torque transmission. When the rotational torque is more than a permissible value determined by the exerting force of the diaphragm spring 33 and the frictional force of the plates 34, 35 between the driving plate 15 and the driving discs 29, 30, the frictional plates 34, 35 will relatively slide as shown by dotted line $A_1$ or $B_1$ to thereby impart the transmitting torque as shown by solid line $A_2$ or $B_2$ in FIG. 2. As a consequence, any sudden variation of the torque between the input shaft 11 and the output shaft 12 may be limited by the inertia member 13 to absorb the torque variation to the clutch 14. It is to be noted that the energy on the compression springs 36 for absorbing the vigorous torque variation will not be stored more than a predetermined value thereby avoiding the possible affect to the clutch 14 due to vibrations of the springs 36.

Figure 3:
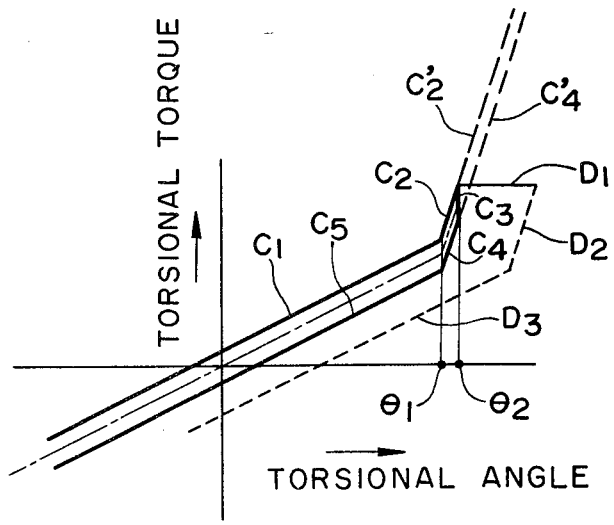
FIG. 3 is also a schematic representation for explanation of the hysteresis variation on the clutch assembly of FIG. 1 in accordance with the torque transmission.

In addition, the hysteresis generated in the range of the small transmitting torque is relatively small as indicated by the lines $C_1$-$C_2$-$C_3$-$C_4$-$C_5$ while the hysteresis generated in the range of the large transmitting torque is large as indicated by the lines $C_1$-$C_2$-$D_1$-$D_2$-$D_3$ in FIG. 3. Thus, the energy may be dispersed upon torque variation more than a predetermined value thereby facilitating the torque change to the acceleration from the deceleration.

Obviously many modifications and variations are possible in light of the above teaching and the invention should be defined only by the appended claims as follows:

I claim:

1. A rotational torque transmission mechanism interposed between an input member and an output member, comprising inertia members including a first member fixed to said input member and a second member cooperating with said output member, and means interposed between said first and second members for transmitting a rotational torque of said input member to said output member therethrough, said means including dampers and a torque limiting clutch for limiting the rotational torque transmission, said dampers comprising two parallel discs mounted on said first member, two parallel driven plates fixed to said second member, and resilient elements carried on said discs and driven plates to transmit the torque from said discs to said driven plates, and said torque limiting clutch comprising a spring interposed between said two discs for urging said two discs in an axially opposite direction.

2. A rotational torque transmission mechanism as set forth in claim 1 wherein said torque limiting clutch further comprises two parallel frictional plates each interposed between said first member and said disc, said spring urging said frictional plates into frictional engagement with said first member through said discs.

3. A rotational torque transmission mechanism as set forth in claim 2 wherein said first member comprises a driving plate fixed to said input member and a ring gear fixed to said driving plate between which is formed an annular space to accommodate said spring and frictional plates.

4. A rotational torque transmission mechanism as set forth in claim 2 wherein one of said discs is mounted at the inner periphery thereof on a thrust plate slidable on one of said driven plates.

5. A rotational torque transmission mechanism as set forth in claim 1, further comprising a clutch disc assembly which includes a clutch cover fixed to said second member, a diaphragm spring to transmit the rotational torque from said clutch cover to a pressure plate, and clutch facing assembly interposed between said pressure plate and said second member and mounted on said output member to thereby transmit the rotational torque from said input member to said output member.

* * * * *